US010151576B2

(12) United States Patent
Haverkamp et al.

(10) Patent No.: US 10,151,576 B2
(45) Date of Patent: Dec. 11, 2018

(54) CONFOCALLY CHROMATIC SENSOR FOR DETERMINING COORDINATES OF A MEASUREMENT OBJECT

(71) Applicant: CARL ZEISS INDUSTRIELLE MESSTECHNIK GMBH, Oberkochen (DE)

(72) Inventors: Nils Haverkamp, Aalen (DE); Christoph Husemann, Jena (DE)

(73) Assignee: CARL ZEISS INDUSTRIELLE MESSTECHNIK GMBH, Oberkochen (DE)

( * ) Notice: Subject to any disclaimer, the term of this patent is extended or adjusted under 35 U.S.C. 154(b) by 0 days.

(21) Appl. No.: 15/786,721

(22) Filed: Oct. 18, 2017

(65) Prior Publication Data

US 2018/0135963 A1    May 17, 2018

(30) Foreign Application Priority Data

Nov. 4, 2016    (DE) .................. 10 2016 221 630

(51) Int. Cl.
*G01B 11/00*    (2006.01)

(52) U.S. Cl.
CPC ........ *G01B 11/002* (2013.01); *G01B 2210/50* (2013.01)

(58) Field of Classification Search
CPC . G01B 11/0608; G01B 11/0641; G01B 11/24; G01B 2210/56; G01B 2210/50; G02B 21/0032; G02B 21/0076
See application file for complete search history.

(56) References Cited

U.S. PATENT DOCUMENTS

| | | | | |
|---|---|---|---|---|
| 6,031,661 A | * | 2/2000 | Tanaami | G01B 11/24 356/613 |
| 2007/0109546 A1 | * | 5/2007 | Meshulach | G01N 21/21 356/445 |

(Continued)

FOREIGN PATENT DOCUMENTS

| | | |
|---|---|---|
| DE | 10 2006 007 172 | 8/2007 |
| DE | 10 2008 017 481 | 10/2009 |

(Continued)

OTHER PUBLICATIONS

Matthias Hillenbrand et al.; Chromatic confocal matrix sensor with actuated pinhole arrays; May 2015; pp. 4927-4936.

*Primary Examiner* — Sang H Nguyen
(74) *Attorney, Agent, or Firm* — Harness, Dickey & Pierce, P.L.C.

(57) ABSTRACT

A confocally chromatic sensor for determining coordinates of two different determination locations of a measurement object. The confocally chromatic sensor comprises:
  a first stop element having two hole elements;
  an illumination device configured to generate an illumination light beam to illuminate the measurement object through the first stop element at the two determination locations;
  a first optical element configured to focus a portion of the illumination light beam at two focal points in one focal plane along an optical axis of the first optical element;
  a sensor unit having a second optical element and a sensor element configured to determine a wavelength-dependent image content;
  a confocal stop element having two hole elements, and configured to transmit a portion of a detection light beam emanating from the measurement object to the second optical element for which the measurement (Continued)

object is in the focal plane of the first optical element, to generate the wavelength-dependent image content; and an evaluation unit configured to determine the two coordinates of the determination locations from the wavelength-dependent image content.

15 Claims, 1 Drawing Sheet

(56) References Cited

U.S. PATENT DOCUMENTS

| | | | | |
|---|---|---|---|---|
| 2008/0100850 A1* | 5/2008 | Watson | ............ | G01B 11/0608 356/601 |
| 2010/0296106 A1* | 11/2010 | Gates | ............ | G02B 21/0064 356/614 |
| 2013/0162972 A1* | 6/2013 | Sesko | ............ | G01B 21/045 356/4.05 |
| 2013/0278939 A1* | 10/2013 | Pfister | ............ | G01B 11/25 356/601 |
| 2014/0043619 A1* | 2/2014 | Deng | ............ | G01B 11/24 356/601 |
| 2014/0150953 A1* | 6/2014 | Sieben | ............ | B29C 65/1638 156/64 |
| 2014/0152839 A1 | 6/2014 | Menon | | |
| 2015/0085360 A1* | 3/2015 | Eguchi | ............ | G02B 21/0032 359/385 |
| 2015/0286060 A1 | 10/2015 | Roh et al. | | |
| 2016/0377412 A1* | 12/2016 | Li | ............ | G01B 11/0608 356/630 |

FOREIGN PATENT DOCUMENTS

| | | |
|---|---|---|
| EP | 1 984 770 | 9/2009 |
| EP | 2 087 312 | 2/2015 |
| FR | 716.727 | 5/1931 |
| FR | 2 950 441 | 3/2011 |

\* cited by examiner

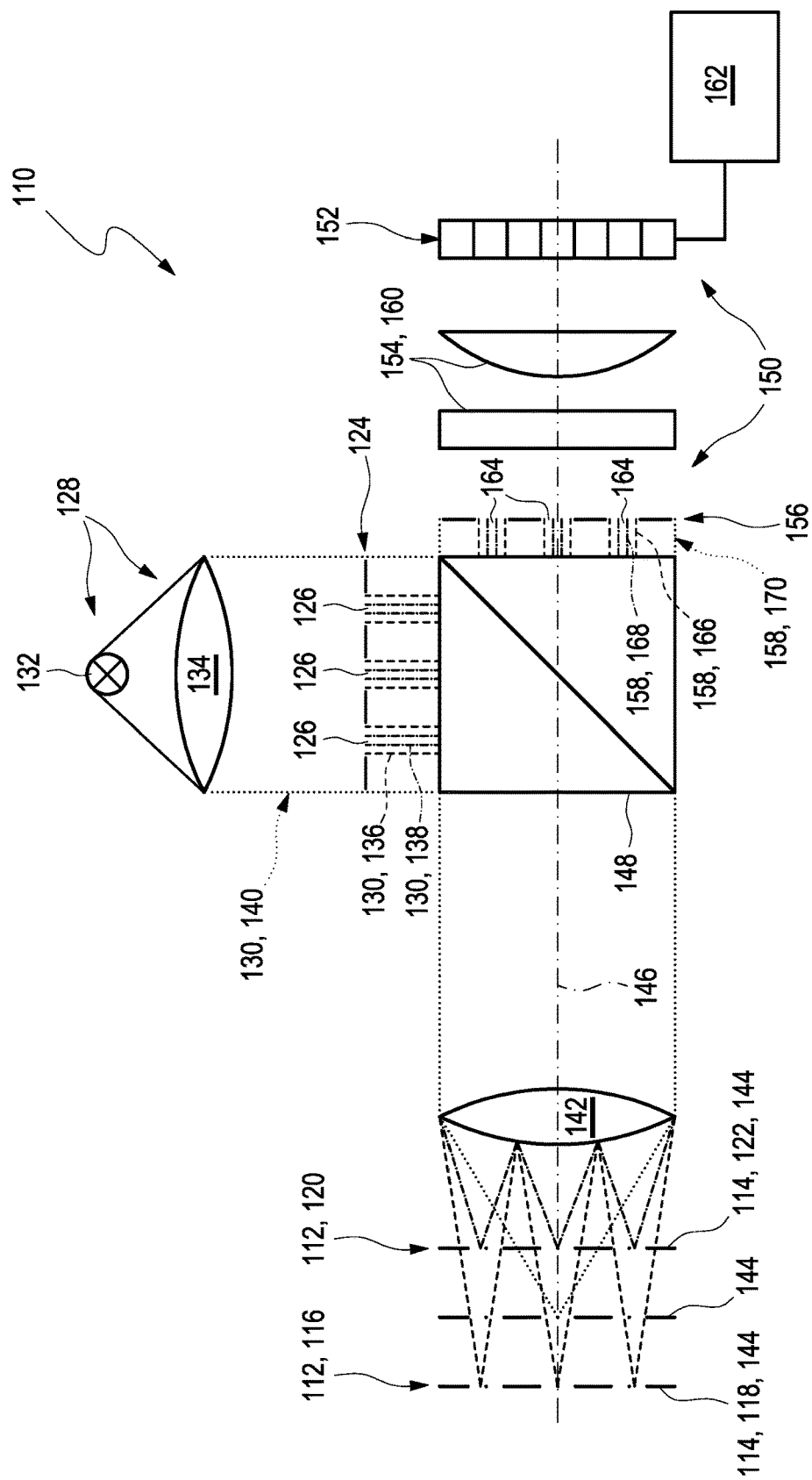

CONFOCALLY CHROMATIC SENSOR FOR DETERMINING COORDINATES OF A MEASUREMENT OBJECT

CROSS-REFERENCE TO RELATED APPLICATION

This application claims priority from German patent application DE 10 2016 221 630.9, filed on Nov. 4, 2016. The entire content of this prior application is incorporated herein by reference.

BACKGROUND OF THE INVENTION

The invention relates to a confocally chromatic sensor and a method for determining coordinates of at least two different determination locations of at least one measurement object. The present invention relates in particular to the field of coordinate measuring technology using a non-contact coordinate measuring machine.

Various devices and methods for determining coordinates of at least two different determination locations of a measurement object, in particular of an extensive measurement object, are known from the prior art. By way of example, methods for topography measurements such as, for example, triangulation methods, deflectometry or stripe projections are known. These methods can be used for whole-area measurements over relatively large regions into the square meters range. However, accuracies required for coordinate measuring technology, for example into the nanometers range, cannot be achieved by means of such methods.

Confocal and confocally chromatic distance sensors, so-called confocally chromatic point sensors, are furthermore known. In the case of such sensors, a depth determination is carried out by means of an evaluation of an intensity distribution along a distance coordinate z, also called height coordinate. Confocally chromatic sensors make it possible to measure the distance coordinate z with a single image. In principle, in the case of such sensors, use is made of measurement objective lenses having chromatic aberration, which focus portions of a light beam with different wavelengths in different focal planes along an optical axis of the sensor. Each wavelength of the light beam can thus be assigned a distance coordinate. If a focus of a wavelength is situated on a surface of the measurement object, an intensity maximum can be measured for said wavelength on a sensor element of the confocally chromatic sensor and the depth can thus be determined.

However, a measurement of an extensive measurement object by means of such sensors can necessitate a significantly longer measurement duration. Moreover, when scanning a surface of the measurement object, such sensors have to be moved accurately with respect to said surface. Furthermore, confocally chromatic sensors are generally expensive, large and heavy. Integration into an existing optical system can be difficult, moreover, since imaging metrology usually has a good chromatic correction. In particular, existing optical systems attempt to avoid an imaging aberration which is the basis of the confocal chromatic sensor. Furthermore, by way of example, front lenses and/or a lens system of confocally chromatic point sensors are not suitable for an areal imaging.

Therefore, it is an object of the present invention to provide a chromatically confocal sensor and a method which at least largely avoid the disadvantages of known devices and methods. In particular, the intention is to enable a determination of distance coordinates of at least two different determination locations of at least one extensive measurement object.

BRIEF SUMMARY OF THE INVENTION

This object is achieved by means of a device and a method having the features of the independent patent claims. Preferred configurations, which can be realized individually or in combination, are presented in the dependent claims.

Hereinafter the terms "have", "comprise" or "include" or any grammatical deviations therefrom are used in a non-exclusive way. Accordingly, these terms can refer either to situations in which, besides the feature introduced by these terms, no further features are present, or to situations in which one or more further features are present. By way of example, the expression "A has B", "A comprises B" or "A includes B" can refer either to the situation in which, apart from B, no further element is present in A (i.e. to a situation in which A exclusively consists of B), or to the situation in which, in addition to B, one or more further elements are present in A, for example element C, elements C and D or even further elements.

Furthermore, it is pointed out that the terms "at least one" and "one or more" and grammatical modifications of these terms or similar terms, if they are used in association with one or more elements or features and are intended to express the fact that the element or feature can be provided singly or multiply, in general are used only once, for example when the feature or element is introduced for the first time. When the feature or element is subsequently mentioned again, the corresponding term "at least one" or "one or more" is generally no longer used, without restriction of the possibility that the feature or element can be provided singly or multiply.

Furthermore, hereinafter the terms "preferably", "in particular", "by way of example" or similar terms are used in conjunction with optional features, without alternative embodiments thereby being restricted. In this regard, features introduced by these terms are optional features, and there is no intention to restrict the scope of protection of the claims, and in particular of the independent claims, by these features. In this regard, the invention, as will be recognized by the person skilled in the art, can also be carried out using other configurations. Similarly, features introduced by "in one embodiment of the invention" or by "in one exemplary embodiment of the invention" are understood as optional features, without alternative configurations or the scope of protection of the independent claims thereby being intended to be restricted. Furthermore, all possibilities of combining the features introduced by these introductory expressions with other features, whether optional or non-optional features, are intended to remain unaffected by said introductory expressions.

In a first aspect of the present invention, a confocally chromatic sensor for determining coordinates of at least two different determination locations of at least one measurement object is proposed.

In this case, a measurement object can generally be understood in the context of the present invention to mean an arbitrarily shaped object to be measured. By way of example, the measurement object can be selected from the group consisting of a test specimen, a workpiece to be measured and a component to be measured, for example a motor vehicle. Other measurement objects are also conceivable, however. In particular, the measurement object can be a planar measurement object, for example having an extensive surface. The surface can be at least partly reflective. Partly reflective can be understood to mean that the surface of the measurement object is configured to specularly reflect and/or to return at least one portion of an illumination light beam.

A confocally chromatic sensor can be understood in principle to mean an optical sensor having at least one confocally chromatic beam path. In the context of the present invention, the term "beam path" can be understood to mean a course of light beams through optical elements. In the context of the present invention, a "chromatically confocal beam path" can be understood to mean a beam path in which an illumination beam path and a detection beam path are confocal for at least one wavelength of an illumination light beam. In particular, for at least one wavelength of the illumination light beam the condition can be met that a first focus is situated on a determination location on the surface of the measurement object and at the same time a second focus is situated at a point in a centre of a stop element which is arranged upstream of a sensor element in a direction of propagation of a light beam returned from the measurement object. The confocally chromatic sensor can be configured to measure a measurement object, in particular a surface and/or a surface contour of a measurement object. In particular, the confocally chromatic sensor can be a non-contact distance sensor in the field of coordinate measuring technology or can be used in a non-contact distance sensor. The confocally chromatic sensor can be configured to measure an extensive, in particular non-punctiform, surface of the measurement object. In particular, the confocally chromatic sensor can be a chromatic area sensor and/or a chromatic scanning point sensor.

In the context of the present invention, the expression "determination location" can be understood to mean a fundamentally arbitrary location, in particular a point or an area, on the surface to be measured of the measurement object at which a determination of a coordinate is carried out. By way of example, a determination location can be a measurement point on the surface of the measurement object. In the context of the present invention, "different determination locations" can be understood to mean a spatial separation, for example in at least one spatial direction, of the determination locations on the surface, wherein the determination locations are permitted to at least partly overlap. "At least partly overlap" can be understood to mean that the determination locations are not completely congruent. In the context of the present invention, coordinates of a measurement object can be understood to mean coordinates on the surface to be measured of the measurement object, in particular distance coordinates. One or more coordinate systems can be used for this purpose. By way of example, a Cartesian coordinate system or a spherical coordinate system can be used. Other coordinate systems are also conceivable. The confocally chromatic sensor can have an optical axis in the viewing direction of a sensor element. The optical axis can be an axis of the coordinate system, for example the z-axis. A distance coordinate can be understood to mean a coordinate along the z-axis. Further axes, for example x-axis and y-axis, can be provided perpendicular to the z-axis. A determination of a coordinate can be understood to mean, in particular, a determination of a distance between the respective determination location of the measurement object, and the confocally chromatic sensor, for example a distance between the respective determination location of the measurement object and at least one element of the confocally chromatic sensor, in particular the sensor element and/or at least one confocal stop element. The confocally chromatic sensor can be configured to determine in each case at least one coordinate at a multiplicity of determination locations, in particular simultaneously.

The confocally chromatic sensor comprises:
at least one first stop element having at least two hole elements;
at least one illumination device configured to generate at least one illumination light beam and to illuminate the measurement object through the first stop element at the at least two determination locations;
at least one first optical element, configured to focus at least one portion of the illumination light beam at least two focal points in at least one focal plane along an optical axis of the first optical element, wherein the illumination device and/or the first optical element have/has chromatically aberrative properties;
at least one sensor unit, wherein the sensor unit has at least one sensor element, wherein the sensor element is configured to determine at least one wavelength-dependent image content, wherein the sensor unit has at least one second optical element;
at least one confocal stop element having at least two hole elements, wherein the confocal stop element is configured to transmit at least one portion of at least one detection light beam emanating from the measurement object to the second optical element for which the measurement object is in the focal plane of the first optical element, wherein the second optical element is configured to generate the wavelength-dependent image content from the portion of the detection light beam;
at least one evaluation unit configured to determine the at least two coordinates of the determination locations from the wavelength-dependent image content.

In the context of the present invention, "stop element" can be understood to mean, in principle, an optical element or component of the confocally chromatic sensor which is configured to limit an extent of a beam of rays. The designation "first" stop element should be understood as a pure designation and in particular provides no information about an order or whether the confocally chromatic sensor has further stop elements. The first stop element can be arranged in front of the illumination device. A "confocal stop element" can be understood to mean a fundamentally arbitrary stop element which is arranged in a focal plane of the first optical element upstream of the sensor and is configured to block out defocused portions of the detection light beam, in particular strongly defocused portions, and to transmit focused portions. An arrangement, in particular a position, of the confocal stop element can be dependent on the measurement object, a quantity of light and a desired resolution, for example a lateral resolution and/or resolution of the distance determination.

In the context of the present invention, a hole element can be understood to mean a fundamentally arbitrarily shaped opening. The first stop element and the confocal stop element can be configured as optical elements having at least two arbitrarily shaped and/or settable and/or adjustable openings. The first stop element and/or the confocal stop element can have a multiplicity of hole elements, for example a hole grid comprising a plurality of holes.

A hole element of the first stop element and/or of the confocal stop element can have at least one bandpass filter, in particular at least one structured dielectric bandpass filter. The first stop element can be configured to influence, in particular to attenuate and/or to block, at least one portion of the illumination light beam having at least one first wavelength. In particular, the first stop element and/or the confocal stop element can be configured to transmit at least one portion of the illumination light beam having a wavelength without any influencing. The first stop element can be configured to influence, for example to attenuate and/or to block, further portions having other wavelengths. A configuration having one or more bandpass filters can allow a selection of at least one wavelength, also called colour, from an emission spectrum of the illumination device. The sensor element can be configured to image the measurement object at said wavelength, in particular over the whole area. A whole-area image capture and/or whole-area imaging of the measurement object, in particular a two-dimensional, lateral, in particular in x and y, image capture and/or imaging, can be carried out with this selected wavelength. The confocally chromatic sensor can be configured to carry out the determination of the coordinates, in particular of the distance coordinates, and capture of at least one lateral imaging of the measurement object simultaneously. The expression "simultaneously" can be understood to mean a simultaneous and/or at least partial temporal overlap of the determination of the coordinates and the capture of the lateral imaging. In one embodiment, the wavelength selected for the areal imaging can be arranged in a centre of the emission spectrum of the illumination device. By way of example, the selected wavelength can be in a centre of a spatial range generated by the chromatic imaging aberration, in particular longitudinal aberration, of the first optical element. In particular, spectral portions having longer and shorter wavelengths than the selected wavelength can be focused in an object space. In this regard, the portions chosen and/or used for the determination of the distance coordinates can generate a distance control signal for the areal imaging. The sensor unit can be configured as a chip which is coated with at least one bandpass filter raster and in which the pixels arranged downstream of the bandpass filter capture the lateral imaging of the measurement object and in which protected and/or covered pixels effecting broadband pick-up receive the wavelength-dependent image content. The protected and/or covered pixels effecting broadband pick-up can be protected and/or covered for example with at least one band block and/or narrowband mirror. In the case of such a configuration, the portions of the detection light beam which are used for the lateral imaging can be influenced by the second optical element. The evaluation unit can be configured to deconvolve an influence of the second optical element from the lateral imaging determined by the sensor element by means of at least one deconvolution operation. The confocally chromatic sensor can be configured to determine a multiplicity of vertical and/or laterally offset lateral imagings, in particular an image stack, and to combine them to form a combined lateral imaging. This can make it possible to support and increase the accuracy of the deconvolution operation, in particular in embodiments in which, as described further below, the illumination device introduces a chromatism.

The confocal stop element can have a multiplicity of hole elements. A hole element can comprise at least one bandpass filter, in particular at least one structured dielectric bandpass filter. The confocal stop element can have the same number of hole elements as the first stop element. The confocal stop element comprises at least one second stop element, which can be arranged upstream of the sensor element in the direction of propagation of the detection light beam. The confocal stop element can be arranged in such a way that light returned from the measurement object can impinge on the confocal stop element. The confocal stop element can be configured to illuminate the sensor element. For at least one wavelength of the illumination light beam, a focus can be situated on the surface of the measurement object. At the same time, a portion of the detection light beam for this wavelength can be focused in at least one hole element, in particular in exactly one hole element, of the confocal stop element in such a way that the intensity on the sensor element becomes maximal. The second stop element can be configured to block out all further non-focused spectral portions of the detection light beam.

A distance between two hole elements of the first stop element and/or of the confocal stop element can be such that confocality conditions are met. Confocality conditions can be understood to mean the condition that defocused portions of the detection light beam are blocked out and only focused portions are incident in a hole element and transmitted. In particular, the distance between two adjacent hole elements can be such that strongly defocused light is not incident in an adjacent hole element and transmitted. The distance between two hole elements can be chosen in such a way that spectra of the hole elements overlap. The evaluation unit, as described further below, can be configured to separate overlapping spatial and spectral information, in particular by means of at least one algorithmic method.

The confocally chromatic sensor comprises at least one illumination device configured to generate at least one illumination light beam and to illuminate the measurement object through the first stop element. In the context of the present invention, an illumination device can be understood to mean an arbitrary device which is configured to generate at least one light beam. The illumination device can have at least one light source. The illumination device can have at least one polychromatic light source and/or at least one white light source and/or at least one broadband light source. The light source can have a wide and uniformly distributed spectral density. In the context of the present invention, "to illuminate the measurement object through" can be understood to mean that the illumination device is configured to illuminate the first stop element and furthermore to illuminate the surface, in particular a point or an area on the surface, of the measurement object. The illumination device can furthermore have at least one further optical element, in particular a lens, which is configured to focus the light beam generated by the light source.

In the context of the present invention, "light" can be understood to mean electromagnetic radiation in at least one spectral range selected from the visible spectral range, the ultraviolet spectral range and the infrared spectral range. The term visible spectral range encompasses, in principle, a range of 380 nm to 780 nm. The term infrared (IR) spectral range encompasses, in principle, a range of 780 nm to 1000 µm, wherein the range of 780 nm to 1.4 µm is designated as near infrared (NIR), and the range of 15 µm to 1000 µm is designated as far infrared (FIR). The term ultraviolet encompasses, in principle, a spectral range of 100 nm to 380 nm. Visible light, that is to say light from the visible spectral range, is preferably used in the context of the present invention. The term "light beam" can be understood to mean, in principle, a quantity of light which is emitted and/or radiated in a specific direction. The light beam can be a beam of rays. The term "illumination light beam" can be understood to mean a light beam which is generated by the illumination device and illuminates the measurement object, in particular the surface of the measurement object. "At least one detection light beam emanating from the measurement object" can be understood to mean a light beam which is returned from the measurement object, in particular from the surface of the measurement object and is detectable by the sensor element. The detection light beam can have a direction of propagation, such that the detection light beam illuminates the confocal stop element and the sensor element.

The confocally chromatic sensor comprises at least the one first optical element configured to focus the at least one portion of the illumination light beam at least two focal points in at least one focal plane along an optical axis of the first optical element. A focal plane can be understood to mean a plane perpendicular to the optical axis in which at least one focal point of the optical element for at least one wavelength is arranged. In particular, the first optical element can be configured to focus a multiplicity of portions of the illumination light beam depending on the wavelength at a multiplicity of different focal planes along the optical axis. The chromatically confocal sensor can be configured to focus portions of an illumination light beam having different wavelengths in focal planes along an optical axis of the sensor. By way of example, a first portion of the illumination light beam having a first wavelength can be focused in a first focal plane, for example at a first point, in particular a first z-coordinate, and a second portion of the illumination light beam having a second wavelength, which is different from the first wavelength, can be focused in a second focal plane, for example a second point, in particular a second z-coordinate, which is different from the first point. The designations "first" and "second" optical element should be understood as pure designations and, in particular, provide no information about an order or whether the confocally chromatic sensor has further optical elements. In the context of the present invention, an optical element can be understood to mean an arbitrary optical structural part or an arbitrary optical component. The first optical element can comprise a lens element and/or a lens group. The first optical element can be an optical element having chromatic aberration. The confocally chromatic sensor can have at least one transfer device. The transfer device can be configured as part of the first optical element or as a separate element. The transfer device can be configured to guide and/or to direct light generated by the illumination device onto the measurement object, in particular onto the surface of the measurement object. Furthermore, the transfer device can be configured to guide and/or to direct light returned and/or reflected from the measurement object onto the second stop element. The transfer device can be selected from the group consisting of: at least one beam splitter; at least one lens; at least one lens group.

The illumination device and/or the first optical element have chromatically aberrative properties. The expression "chromatically aberrative" properties can be understood to mean that the illumination device and/or the first optical element can be configured to separate portions of the illumination light beam wavelength-dependently. By way of example, the first optical element can be a lens having chromatic aberration. The illumination device can be configured to introduce and/or to amplify a separation of the portions of the illumination light beam having different wavelengths, in particular the chromatism. The illumination device can have at least one element selected from the group consisting of a structured holographic raster, a refractive holographic raster, a diffractive holographic raster, a micro-optical unit. Use of an illumination device which introduces and/or amplifies a separation of the portions of the illumination light beam having different wavelengths can make it possible to use an imaging optical unit without imaging aberrations, in particular with chromatic correction.

The confocally chromatic sensor comprises at least one sensor unit. The sensor unit comprises at least one sensor element and at least one second optical element. The sensor element and the second optical element can be configured as separate elements. In the context of the present invention, a "sensor element" can be understood to mean an arbitrary device which is configured to capture at least one optical measurement variable, for example an intensity, of the detection light beam and to generate a corresponding signal, for example an electrical signal, for example an analogue and/or a digital signal. The sensor element can have a multiplicity of pixels, in particular a matrix of pixels. The sensor element can have a pixel array. The pixel array can be square, for example, with a 150×150 pixel matrix, for example. Other shapes and numbers of pixels are also conceivable, however. The sensor element can have a camera chip. The sensor element can have for example a CCD sensor, in particular a CCD chip. The sensor element can be configured to detect contrasts, in particular black-white contrasts. The sensor element can be an RGB sensor element. The sensor element can have at least one colour filter configured to transmit at least one wavelength from the detection light beam. By way of example, the sensor element can have an RGB filter. The sensor element can be a polychromatic sensor element. The sensor element can be configured to image a multiplicity of wavelengths, for example multi-spectrally or hyperspectrally.

As used herein and in the appended claims, the phrase "wavelength-dependent image content" shall mean, in principle, an arbitrary wavelength-dependent imaging of the portions of the detection light beam which have passed through the confocal stop element. By way of example, the wavelength-dependent image content can be selected from the group consisting of: at least one pattern, at least one diffraction figure, at least one geometric figure, at least one colour-dependent figure. By way of example, the wavelength-dependent image content for two different wavelengths can have at least two figures of different shapes.

The second optical element is configured to generate the wavelength-dependent image content from the portion of the detection light beam. The second optical element can be configured to generate the wavelength-dependent image content from a multiplicity of portions of the detection light beam. In the context of the present invention, the expression "to generate" can be understood to mean generating and/or imaging the wavelength-dependent image content. By way of example, the second optical element can be selected from the group consisting of at least one diffractive optical element and one refractive optical element. The second optical element can have an array composed of diffractive and/or refractive optical elements. The second optical element can be configured to image the detection light beam in an image plane, for example in an image plane on the sensor element, in particular to project it into the image plane. The second optical element can be configured to image the detection light beam in the image plane in such a way that at least one wavelength-dependent pattern arises. The second optical element can be configured to separate, in particular spatially separate, portions of the detection light beam, in particular spectral information of the detection light beam. The second optical element can be configured to separate at least two portions of the detection light beam depending on the wavelength in the image plane in such a way that the portions are spatially separated and/or arranged in an overlapping fashion.

The diffractive optical element can be configured to influence, in particular to act on, the portion, in particular a multiplicity of portions, of the detection beam wavelength-dependently. The diffractive optical element can be configured to modulate portions of the detection beam wavelength-dependently, in particular to modulate the phases. The diffractive element can be configured to generate interference patterns. The diffractive optical element can be configured to separate the portions of the detection beam wavelength-dependently. The diffractive element can be configured to modulate an amplitude of the detection beam. The second optical element can be configured to image, in particular to project, the portions of the detection light beam in a new image plane. The second optical element can be configured to image the portions of the detection light beam in the image plane in such a way that at least one wavelength-dependent pattern arises.

The diffractive optical element can have a periodic array composed of diffractive individual cells. One example of such an array is described in US 2014/0152839 A1. The periodic array composed of diffractive individual cells can be configured to split the detection light beam of a determination location, that is to say from an object point, into an (n,n) array of pixels, wherein each of the pixels encodes a different wavelength range. The evaluation unit, as described further below, can be configured to separate overlapping spatial and spectral information, in particular by means of at least one algorithmic method.

The diffractive optical element can be configured as a separate component. The second optical element can be connected to the sensor element, in particular quasi-monolithically. The confocally chromatic sensor can have, as described above, at least one beam splitter. As an alternative or in addition to a connection of the second optical element to the sensor element, the second optical element can be arranged on the beam splitter. The first stop element and/or the confocal stop element can be connected to the beam splitter, in particular monolithically. In this regard, a compact and stable beam splitter module and/or stop module can arise which fixes two conjugate planes in the illumination and detection beam path. The beam splitter module and/or the stop module can be composed of a material having a low coefficient of thermal expansion, for example selected from the group consisting of at least one ceramic, quartz, diamond. The evaluation unit can be configured to determine a point cloud of coordinates of determination locations. Points within the point cloud can have a spatial relationship, in particular a temperature-independent spatial relationship, which is generated by an arrangement of the optical components of the confocally chromatic sensor, in particular an arrangement and configuration of the stop elements and/or of the imaging optical unit and/or of the second optical element and/or of the beam splitter. The spatial relationship can represent a function of a material measure and allow a situation in which a relative movement of the confocally chromatic sensor with respect to the measurement object need not be performed with high accuracy. Accurate position information of a movement frame may no longer be necessary. A reduction of costs and/or increase in speed and/or increase in agility can thus be achieved. The confocally chromatic sensor can be configured to determine a multiplicity of vertical and/or laterally offset point clouds, for example successively, and to combine them to form a combined point cloud, also called stitching. An increase in accuracy can be achieved by the stitching.

In one embodiment, the second optical element can have at least one refractive optical element. By way of example, the second optical element can have at least one array, in particular a uniform two-dimensional array, of prisms. The refractive optical element can be arranged upstream of the sensor element in the direction of propagation of the detection light beam, in particular in proximity to the sensor element. An arrangement, in particular a position, of the refractive optical element can be dependent on the pixel size of the sensor element, the spectral bandwidth used, the distance accuracy to be achieved and the optical effect of the refractive element. By way of example, the refractive optical element can be arranged at a distance upstream of the sensor element of 0.1 to 20 micrometers, preferably of 0.5 to 10 micrometers. Larger distances are also conceivable. A use near an intermediate image is also conceivable. One example of a uniform two-dimensional array of prisms is described in US 2015/0286060 A1.

The confocally chromatic sensor comprises at least one evaluation unit configured to determine the at least two coordinates of the determination locations from the wavelength-dependent image content. In this case, "an evaluation unit" can generally be understood to mean an electronic device configured to evaluate signals generated by the sensor element. By way of example, one or more electronic connections between the sensor element and the evaluation unit can be provided for this purpose. The evaluation unit can comprise for example at least one data processing device, for example at least one computer or microcontroller. The data processing device can have one or more volatile and/or non-volatile data memories, wherein the data processing device can be configured for example in terms of programming to drive the sensor element. The evaluation unit can furthermore comprise at least one interface, for example an electronic interface and/or a human-machine interface such as, for example, an input/output device such as a display and/or a keyboard. The evaluation unit can be constructed for example centrally or else in a decentralized manner. Other configurations are also conceivable.

The evaluation unit can be configured to recognize the wavelength-dependent image content and/or to recognize a distribution and/or a position of the wavelength-dependent image content and to determine a hole element of the confocal stop element that generates the wavelength-dependent image content. By way of example, the evaluation unit can be configured to recognize a pattern and/or a position of the pattern. The evaluation unit can be configured to carry out a pattern recognizing algorithm, in particular a pattern recognition algorithm. By way of example, a, for example experimentally, predetermined and/or theoretical wavelength-dependent image content can be stored for at least one wavelength in the evaluation unit. By way of example, the predetermined and/or theoretical wavelength-dependent image content can be stored for a multiplicity of wavelengths. By way of example, the predetermined and/or theoretical wavelength-dependent image content can be stored for those wavelengths which are transmitted and/or selected by the at least one bandpass filter of the first stop element and/or of the confocal stop element for the determination of the coordinates. The predetermined and/or theoretical wavelength-dependent image content can comprise information about a number of illuminated pixels and/or a position of the illuminated pixels and/or an intensity of the illumination of the pixels. The evaluation unit can be configured to determine an illumination of the pixels by the portions of the detection light beam. The evaluation unit can be configured to determine a number of illuminated pixels and/or a position of the illuminated pixels and/or an intensity of the illumination of the pixels. The evaluation unit can be configured to compare the predetermined and/or theoretical wavelength-dependent image content with the wavelength-dependent image content determined by the sensor element and to assign it to at least one wavelength.

The evaluation unit can be configured to determine, in particular to reconstruct, a hole element of the confocal stop element that generates the pattern. The evaluation unit can be configured to determine, by means of at least one reconstruction algorithm, a determination location, in particular at least one hole element of the confocal stop element from which the portion of the detection beam originates. By way of example, a hole element that generates the pattern can be determined from the position of the illuminated pixels and/or from a structure of the pattern. Such an evaluation of the wavelength-dependent image content can enable an overlapping use of the pixels of the sensor element. An overlapping use of the pixels is not possible with known spectrometric approaches. In known spectrometric approaches, a dedicated spectrometer area has to be provided for each hole element of the confocal stop element, such that only a small number of spectrometrically evaluatable hole elements may be possible or a distance resolution of the measuring system may be low, since a large number of spectra in the image space are distributed among a limited number of pixels.

As described above, the evaluation unit can be configured to determine, by means of the reconstruction algorithm, the generating hole element of the confocal stop element, i.e. a hole element of the confocal stop element from which the portion of the detection beam originates. The evaluation unit can be configured to separate overlapping spatial and spectral information, in particular by means of at least one algorithmic method. As an alternative or in addition to a pattern recognition method described above, for example if no patterns are recognizable, for example if the measurement object is configured differently at different depths, a lateral reconstruction, that is to say a determination of the generating hole element of the confocal stop element, can be carried out by means of inverting an effect of the second optical element on the portions of the detection light beam, for example using at least one mathematical optimization method, in particular using the method of least squares. By way of example, the effect of the second optical element can be approximately linear, wherein such deviations from linearity are possible which do not influence or only slightly influence an inversion.

A prerequisite for the inversion of the effect of the second optical element may be conservation of information. In particular, the number of determination locations to be reconstructed times the number of wavelengths to be reconstructed cannot exceed the number of available sensor pixels. An additional use of the pattern recognition method described above can make it possible to determine the generating hole element, even if said prerequisite is not fulfilled. The reconstruction algorithm for determining the generating hole element can comprise at least one compressed sensing method. The use of a compressed sensing method can make it possible to determine the generating hole element, even if the prerequisite of conservation of information is not fulfilled. The evaluation unit, in particular a memory of the evaluation unit, can comprise at least one predefinable or predefined piece of information concerning at least one property of the measurement object. By way of example, the evaluation unit can be configured to select the information, for example from a list, and/or the information can be predefined by a user, for example by means of a human-machine interface. The information can have at least one piece of information selected from the group consisting of: information concerning a surface constitution, for example that the measurement object has only one reflective surface; information concerning a z-variation of the surface, in particular regularities, for example of jumps. By way of example, the information can comprise information about a regularity that after a continuous jump, for example at an edge, the surface changes continuously for a number of pixels before a further edge follows. Other pieces of information concerning the properties of the measurement object are also conceivable, however. By way of example, at least one predefinable and/or predefined basis function can describe the information about the property. The basis function can be chosen for the compressed sensing method in such a way that the determination location and the information about the property are described. The conservation of information can be fulfilled if the number of sensor pixels is not less than the number of basis functions, wherein a number of object points of a three-dimensional object can be greater than the number of basis functions.

The evaluation unit can be configured to carry out an optimizing algorithm. An optimization can be carried out for example by a method based on the principle of the sparse basis. In an optimization of the reconstruction, it is possible to choose and/or predefine a smaller number of basis functions than would actually be necessary for describing the properties of the measurement object. By way of example, a greater regularity of the surface than an actual regularity of a change in the surface can be assumed. The principle of the sparse basis can be used flexibly. The evaluation unit can be configured to select suitable basis functions from a large number of possible basis functions. The principle of the sparse basis prevents an ambiguity in the description of measurement objects by basis functions. Thus, otherwise, for example, a line having a specific length could be represented either by one basis of a line having the length or by two basis functions having only half the length. By way of example, the information about the property can comprise an assumption that the measurement object consists only of edges. The basis functions could be all possible edges, of all conceivable positions, thicknesses and lengths. With the use of the principle of the sparse basis, the optimization algorithm can assume that there is an, albeit unknown, minimum distance between two edges and thus give preference to the existence of a single edge over the existence of two The evaluation unit can be wholly or partly integrated in the sensor unit. The sensor unit can be connected to the evaluation unit for example directly or indirectly. Alternatively or additionally, however, the evaluation unit can also be arranged wholly or partly at the location of the sensor unit, for example in the form of a microcontroller, and/or can be integrated wholly or partly into the sensor unit. The sensor unit can be configured to carry out a pattern recognition. By way of example, the sensor unit can comprise at least one data processing device. By way of example, the data processing device can have at least one data memory. The sensor unit can be configured to store at least one pattern in the data memory, for example in at least one table, for example a look-up table, and to compare the wavelength-dependent image content determined by the sensor element with the stored pattern. By way of example, the sensor unit can be configured to carry out a pattern recognizing algorithm, in particular a pattern recognition algorithm. The sensor unit can have one or more integrated circuits, for example at least one application-specific integrated circuit (ASIC), and/or at least one field programmable gate array (FPGA), and/or at least one data processor, for example at least one microcomputer and/or microcontroller. A partial or complete integration of the evaluation unit into the sensor unit can be advantageous to the effect that transmission of large volumes of data of the image material of the diffraction figures, wavelength-dependent patterns, etc. is not necessary, rather only the actual useful information, such as magnitude at location x, y, is transmitted for example to an interface and/or a further evaluation device, for example of a controller of the coordinate measuring machine.

The sensor element can be configured to determine at least one spatial and spectral dependence of an intensity of the detection light beam in an image plane. In one embodiment, the sensor element can be configured to determine at least one spectral distribution. The evaluation unit can be configured to determine at least one intensity maximum of the spectral distribution and to assign a wavelength to the intensity maximum. A determination of a spectral distribution can be understood to mean a measurement and/or determination of the intensity of the detection light beam as a function of the wavelength. The spectral distribution can comprise an intensity distribution as a function of a wavelength. The sensor element can be and/or comprise a spectrally resolving detector. In particular, the sensor element can be and/or comprise a spectrometer. The sensor unit can have at least one multi-spectral sensor. The sensor unit can have at least one hyperspectral sensor.

In a further aspect, a method for determining coordinates of at least two different determination locations of at least one measurement object is proposed. The method comprises the following method steps:

generating at least one illumination light beam by means of at least one illumination device;

illuminating the measurement object with the illumination light beam by means of a first stop element having at least two hole elements at the at least two determination locations;

focusing at least one portion of the illumination light beam by means of a first optical element at least two focal points in at least one focal plane along an optical axis of the first optical element, wherein the illumination device and/or the first optical element have chromatically aberrative properties;

determining at least one wavelength-dependent image content by means of at least one sensor element of at least one sensor unit, wherein the sensor unit has at least one second optical element, illuminating with at least one detection light beam emanating from the measurement object by means of at least one confocal stop element having at least two hole elements;

generating the wavelength-dependent image content by means of the second optical element from at least one portion of the detection light beam for which the measurement object is in the focal plane of the first optical element;

determining the at least two coordinates of the determination locations by means of at least one evaluation unit from the wavelength-dependent image content.

In this case, the method steps can be carried out in the order specified, wherein one or more of the steps can at least partly also be carried out simultaneously and wherein one or more of the steps can be multiply repeated. Furthermore, further steps can additionally be performed independently of whether or not they are mentioned in the present application. A confocally chromatic sensor according to the invention can be used in the method. For details with regard to the method according to the invention, reference is made to the description of the confocally chromatic sensor according to the invention.

The device according to the invention and the method according to the invention are advantageous by comparison with known methods and devices. An areal measurement of an extensive measurement object can be made possible without loss of resolution and without high-accuracy travel of the movement of mechanical parts.

To summarize, the following embodiments are particularly preferred in the context of the present invention:

Embodiment 1

Confocally chromatic sensor for determining coordinates of at least two different determination locations of at least one measurement object, comprising:

at least one first stop element having at least two hole elements;

at least one illumination device configured to generate at least one illumination light beam and to illuminate the measurement object through the first stop element at the at least two determination locations;

at least one first optical element, configured to focus at least one portion of the illumination light beam at least two focal points in at least one focal plane along an optical axis of the first optical element, wherein the illumination device and/or the first optical element have/has chromatically aberrative properties;

at least one sensor unit, wherein the sensor unit has at least one sensor element, wherein the sensor element is configured to determine at least one wavelength-dependent image content, wherein the sensor unit has at least one second optical element;

at least one confocal stop element having at least two hole elements, wherein the confocal stop element is configured to transmit at least one portion of at least one detection light beam emanating from the measurement object to the second optical element for which the measurement object is in the focal plane of the first optical element; wherein the second optical element is configured to generate the wavelength-dependent image content from the portion of the detection light beam;

at least one evaluation unit configured to determine the at least two coordinates of the determination locations from the wavelength-dependent image content.

Embodiment 2

Confocally chromatic sensor according to the preceding embodiment, wherein the confocally chromatic sensor is configured to determine in each case at least one coordinate at a multiplicity of determination locations, in particular simultaneously.

Embodiment 3

Confocally chromatic sensor according to either of the preceding embodiments, wherein the wavelength-dependent image content is selected from the group consisting of at least one pattern, at least one diffraction figure, at least one geometric figure, at least one colour-dependent figure.

Embodiment 4

Confocally chromatic sensor according to any of the preceding embodiments, wherein the evaluation unit is configured to determine a point cloud of coordinates of determination locations.

Embodiment 5

Confocally chromatic sensor according to the preceding embodiment, wherein the confocally chromatic sensor is configured to determine a multiplicity of vertical and/or laterally offset point clouds and to combine them to form a combined point cloud.

Embodiment 6

Confocally chromatic sensor according to any of the preceding embodiments, wherein the first stop element and/or the confocal stop element have/has a multiplicity of hole elements.

Embodiment 7

Confocally chromatic sensor according to any of the preceding embodiments, wherein a hole element of the first stop element and/or of the confocal stop element has at least one bandpass filter, in particular at least one structured dielectric bandpass filter.

Embodiment 8

Confocally chromatic sensor according to the preceding embodiment, wherein the confocal stop element has a multiplicity of hole elements, wherein the confocal stop element has the same number of hole elements as the first stop element.

Embodiment 9

Confocally chromatic sensor according to any of the preceding embodiments, wherein a distance between two hole elements is such that confocality conditions are met.

Embodiment 10

Confocally chromatic sensor according to any of the preceding embodiments, wherein the sensor element is configured to determine at least one spatial and spectral dependence of an intensity of the at least one portion of the detection light beam in an image plane.

Embodiment 11

Confocally chromatic sensor according to the preceding embodiment, wherein the second optical element is configured to separate at least two portions of the detection light beam depending on the wavelength in the image plane in such a way that the portions are spatially separated and/or arranged in an overlapping fashion.

Embodiment 12

Confocally chromatic sensor according to either of the two preceding embodiments, wherein the second optical element is configured to image the detection light beam in the image plane.

Embodiment 13

Confocally chromatic sensor according to the preceding embodiments, wherein the evaluation unit is configured to recognize the wavelength-dependent image content and/or to recognize a distribution and/or position of the wavelength-dependent image content and to determine a hole element of the confocal stop element that generates the wavelength-dependent image content.

Embodiment 14

Confocally chromatic sensor according to the preceding embodiment, wherein the evaluation unit is configured to carry out a pattern recognition algorithm.

Embodiment 15

Confocally chromatic sensor according to any of the preceding embodiments, wherein the evaluation unit is configured to determine a determination location by means of a reconstruction algorithm.

Embodiment 16

Confocally chromatic sensor according to any of the preceding embodiments, wherein the second optical element is connected to the sensor element, in particular quasi-monolithically.

Embodiment 17

Confocally chromatic sensor according to any of the preceding embodiments, wherein the confocally chromatic sensor has at least one beam splitter, wherein the second optical element is arranged on the beam splitter.

Embodiment 18

Confocally chromatic sensor according to any of the preceding embodiments, wherein the sensor element has a multiplicity of pixels, in particular a matrix of pixels.

Embodiment 19

Confocally chromatic sensor according to the preceding embodiment, wherein the first optical element comprises a lens element and/or a lens group.

Embodiment 20

Confocally chromatic sensor according to the preceding embodiment, wherein the first optical element is an optical element having chromatic aberration.

Embodiment 21

Confocally chromatic sensor according to any of the preceding embodiments, wherein the sensor element is configured to determine at least one spectral distribution.

Embodiment 22

Confocally chromatic sensor according to the preceding embodiment, wherein the evaluation unit is configured to determine at least one intensity maximum of the spectral distribution and to assign a wavelength to the intensity maximum.

Embodiment 23

Confocally chromatic sensor according to any of the preceding embodiments, wherein the sensor unit has at least one multi-spectral sensor.

Embodiment 24

Confocally chromatic sensor according to any of the preceding embodiments, wherein the sensor unit has at least one hyperspectral sensor.

Embodiment 25

Confocally chromatic sensor according to any of the preceding embodiments, wherein the second optical element is selected from the group consisting of at least one diffractive optical element, at least one refractive optical element, in particular an array of prisms.

Embodiment 26

Confocally chromatic sensor according to any of the preceding embodiments, wherein the first stop element and/or the confocal stop element are/is configured to leave uninfluenced at least one portion of the illumination light beam having at least one wavelength.

Embodiment 27

Confocally chromatic sensor according to the preceding embodiment, wherein the sensor element is configured to image the measurement object with said wavelength.

Embodiment 28

Confocally chromatic sensor according to any of the preceding embodiments, wherein the confocally chromatic sensor is configured to carry out the determination of the coordinates and capture of at least one lateral imaging of the measurement object simultaneously.

Embodiment 29

Confocally chromatic sensor according to any of the preceding embodiments, wherein the illumination device has at least one polychromatic light source and/or at least one white light source and/or at least one broadband light source.

Embodiment 30

Confocally chromatic sensor according to any of the preceding embodiments, wherein the illumination device is configured to introduce and/or to amplify a separation of the portions of the illumination light beam having different wavelengths.

Embodiment 31

Confocally chromatic sensor according to the preceding embodiment, wherein the illumination device has at least one element selected from the group consisting of a structured holographic raster, a refractive holographic raster, a diffractive holographic raster, a micro-optical unit.

Embodiment 32

Method for determining coordinates of at least two different determination locations of at least one measurement object, wherein the method comprises the following method steps:

generating at least one illumination light beam by means of at least one illumination device;

illuminating the measurement object with the illumination light beam by means of a first stop element having at least two hole elements at the at least two determination locations;

focusing portions of the illumination light beam by means of a first optical element at least two focal points in at least one focal plane along an optical axis of the first optical element, wherein the illumination device and/or the first optical element have chromatically aberrative properties;

determining at least one wavelength-dependent image content by means of at least one sensor element of at least one sensor unit, wherein the sensor unit has at least one second optical element, illuminating with at least one detection light beam emanating from the measurement object by means of at least one confocal stop element having at least two hole elements;

generating the wavelength-dependent image content by means of the second optical element from at least one portion of the detection light beam for which the measurement object is in the focal plane of the first optical element;

determining the at least two coordinates of the determination locations by means of at least one evaluation unit from the wavelength-dependent image content.

Embodiment 33

Method according to the preceding embodiment, wherein a confocally chromatic sensor according to any of the preceding embodiments is used.

Further details and features of the invention will become apparent from the following description of preferred exemplary embodiments, in particular in conjunction with the dependent claims. In this case, the respective features can be realized by themselves or as a plurality in combination with one another. The invention is not restricted to the exemplary embodiments. The exemplary embodiments are illustrated schematically in the figures. In this case, identical reference numerals in the individual figures designate identical or functionally identical elements or elements corresponding to one another with regard to their functions.

BRIEF DESCRIPTION OF THE DRAWINGS

FIG. 1 shows a schematic illustration of one exemplary embodiment of a confocally chromatic sensor according to the invention.

DETAILED DESCRIPTION OF THE PREFERRED EMBODIMENTS

FIG. 1 shows a schematic illustration of one exemplary embodiment of a confocally chromatic sensor 110 according to the invention for determining coordinates, in particular distance coordinates, of at least two different determination locations 112 of at least one measurement object 114. FIG. 1 illustrates the measurement object schematically with two surface depths, wherein a first determination location 116 is arranged in a first focal plane 118 and a second determination location 120 is arranged in a second focal plane 122.

The confocally chromatic sensor 110 comprises at least one first stop element 124, which has three hole elements 126 in the exemplary embodiment shown in FIG. 1. The confocally chromatic sensor 110 comprises at least one illumination device 128 configured to generate at least one illumination light beam 130 and to illuminate the measurement object 114 through the first stop element 124 at the at least two determination locations 112. The illumination device 128 can have at least one light source 132. The illumination device 128 can have at least one polychromatic light source and/or at least one white light source and/or at least one broadband light source. The light source 132 can have a wide and uniformly distributed spectral density. The illumination device 128 can furthermore have at least one further optical element 134, in particular a lens, which is configured to focus the light beam generated by the light source 132.

The hole elements 126 of the first stop element 124 can have at least one bandpass filter, in particular at least one structured dielectric bandpass filter. FIG. 1 shows an exemplary embodiment in which the first stop element 124 can be configured to influence a first portion 136 of the illumination light beam 130 having a first wavelength and a second portion 138 having a second wavelength of the illumination light beam 130. The second wavelength can be different from the first wavelength. The first stop element 124 can be configured to transmit a third portion 140 of the illumination light beam 130 having a third wavelength without influencing it. By way of example, the first wavelength can be in a red wavelength range, the second wavelength can be in a blue wavelength range and the third wavelength can be in a green wavelength range. A configuration comprising one or more bandpass filters can allow a selection of at least one wavelength, also called colour, from an emission spectrum of the illumination device, for example the third wavelength in the example shown in FIG. 1.

The confocally chromatic sensor 110 comprises at least one first optical element 142 configured to focus at least one portion of the illumination light beam 128 at at least two focal points in at least one focal plane 144 along an optical axis 146 of the first optical element 142. The illumination device 128 and/or the first optical element 142 have/has chromatically aberrative properties. In particular, the first optical element 142 can be configured to focus a multiplicity of portions of the illumination light beam 128 depending on the wavelength at a multiplicity of different focal planes 144 along the optical axis 146. The first optical element 142 can comprise a lens element and/or a lens group. The first optical element 142 can be an optical element having chromatic aberration. The illumination device 128 and/or the first optical element 142 have/has chromatically aberrative properties. The illumination device 128 can be configured to introduce and/or to amplify a separation of the portion of the illumination light beam having different wavelengths, in particular the chromatism. The illumination device 128 can have at least one element selected from the group consisting of a structured holographic raster, a refractive holographic raster, a diffractive holographic raster, a micro-optical unit. Use of an illumination device 128 which introduces and/or amplifies a separation of the portions of the illumination light beam having different wavelengths can make it possible to use an imaging optical unit without imaging aberrations, in particular with chromatic correction.

The confocally chromatic sensor 110 can have at least one transfer device 148. The transfer device 148 can be configured as part of the first optical element 142 or as a separate element. The transfer device 148 can be configured to guide and/or to direct light generated by the illumination device 128 onto the measurement object 114. The transfer device 148 can comprise at least one beam splitter.

The confocally chromatic sensor 110 comprises at least one sensor unit 150, wherein the sensor unit 150 has at least one sensor element 152. The sensor element 152 is configured to determine at least one wavelength-dependent image content. By way of example, the wavelength-dependent image content can be selected from the group consisting of: at least one pattern, at least one diffraction figure, at least one geometric figure, at least one colour-dependent figure. By way of example, the wavelength-dependent image content for two different wavelengths can have at least two figures of different shapes. The sensor element 152 can have a multiplicity of pixels, in particular a matrix of pixels. The sensor element 152 can have a pixel array. The pixel array can be square, for example, with a 150×150 pixel matrix, for example. Other shapes and numbers of pixels are also conceivable, however. The sensor element 152 can have a camera chip. The sensor element 152 can have for example a CCD sensor, in particular a CCD chip. The sensor element 152 can be configured to detect contrasts, in particular black-white contrasts. The sensor element 152 can be an RGB sensor element. The sensor element 152 can have at least one colour filter configured to transmit at least one wavelength from the detection light beam. By way of example, the sensor element 152 can have an RGB filter. The sensor element 152 can be a polychromatic sensor element. The sensor element 152 can be configured to image a multiplicity of wavelengths, for example multi-spectrally or hyperspectrally.

The sensor unit 150 has at least one second optical element 154. The confocally chromatic sensor 110 comprises at least one confocal stop element 156. The confocal stop element 156 is configured to transmit at least one portion of at least one detection light beam 158 emanating from the measurement object 114 to the second optical element 154 for which the measurement object 114 is in the focal plane 144 of the first optical element 142. The transfer device 148 can be configured to guide and/or to direct light returned and/or reflected from the measurement object 114 onto the confocal stop element 156.

The second optical element 154 is configured to generate the wavelength-dependent image content from the portion of the detection light beam 158. The second optical element 154 can be configured to generate the wavelength-dependent image content from a multiplicity of portions of the detection light beam 158. By way of example, the second optical element 154 can be selected from the group consisting of at least one diffractive optical element and one refractive optical element. The second optical element 154 can be configured to image the detection light beam 158 in an image plane, for example in an image plane on the sensor element 152, in particular to project it into the image plane. The second optical element 154 can be configured to image the detection light beam 158 in the image plane in such a way that at least one wavelength-dependent pattern arises. The second optical element 154 can be configured to separate, in particular spatially separate, portions of the detection light beam 158, in particular spectral information of the detection light beam. The second optical element 154 can be configured to separate at least two portions of the detection light beam 158 depending on the wavelength in the image plane in such a way that the portions are spatially separated and/or arranged in an overlapping fashion.

FIG. 1 illustrates an exemplary embodiment in which the second optical element 154 has an array of diffractive optical elements 160. The diffractive optical element 160 can be configured to influence, in particular to act on, the portion, in particular a multiplicity of portions, of the detection beam 158 wavelength-dependently. The diffractive optical element 160 can be configured to modulate portions of the detection beam 158 wavelength-dependently, in particular to modulate phases. The diffractive element 160 can be configured to generate interference patterns. The diffractive optical element 160 can be configured to separate the portions of the detection beam 158 wavelength-dependently. The diffractive element 160 can be configured to modulate an amplitude of the detection beam 158. The second optical element can be configured to image, in particular to project, the portions of the detection light beam 158 in a new image plane. The second optical element 160 can be configured to image the portions of the detection light beam in the image plane in such a way that at least one wavelength-dependent pattern arises. The diffractive optical element 160 can be configured as a separate component. The second optical element 154 can be connected to the sensor element 152, in particular quasi-monolithically. The confocally chromatic sensor 110, as described above, can have at least one transfer device 148, for example a beam splitter. As an alternative or in addition to a connection of the second optical element 154 to the sensor element 152, the second optical element 154 can be arranged on the beam splitter. The first stop element 124 and/or the confocal stop element 156 can be connected to the beam splitter, in particular monolithically. In this regard, a compact and stable beam splitter module and/or stop module can arise which fixes two conjugate planes in the illumination and detection beam path. The beam splitter module and/or the stop module can be composed of a material having a low coefficient of thermal expansion, for example selected from the group consisting of at least one ceramic, quartz, diamond.

The confocally chromatic sensor 110 comprises at least one evaluation unit 162 configured to determine the at least two coordinates of the determination locations 112 from the wavelength-dependent image content. By way of example, one or more electronic connections between the sensor element 152 and the evaluation unit 162 can be provided for this purpose. The evaluation unit can comprise for example at least one data processing device, for example at least one computer or microcontroller. The data processing device can have one or more volatile and/or non-volatile data memories, wherein the data processing device can be configured for example in terms of programming to drive the sensor element 152.

The evaluation unit 162 can be configured to recognize the wavelength-dependent image content and/or to recognize a distribution and/or a position of the wavelength-dependent image content and to determine a hole element 164 of the confocal stop element 156 that generates the wavelength-dependent image content. By way of example, the evaluation unit 162 can be configured to recognize a pattern and/or a position of the pattern. The evaluation unit 162 can be configured to carry out a pattern recognizing algorithm, in particular a pattern recognition algorithm. By way of example, a, for example experimentally, predetermined and/or theoretical wavelength-dependent image content can be stored for at least one wavelength in the evaluation unit 162. By way of example, the predetermined and/or theoretical wavelength-dependent image content can be stored for a multiplicity of wavelengths. The predetermined and/or theoretical wavelength-dependent image content can comprise information about a number of illuminated pixels and/or a position of the illuminated pixels and/or an intensity of the illumination of the pixels. The evaluation unit 162 can be configured to determine an illumination of the pixels by the portions of the detection light beam 158. The evaluation unit 162 can be configured to determine a number of illuminated pixels and/or a position of the illuminated pixels and/or an intensity of the illumination of the pixels. The evaluation unit 162 can be configured to compare the predetermined and/or theoretical wavelength-dependent image content with the wavelength-dependent image content determined by the sensor element 152 and to assign it to at least one wavelength. The evaluation unit 162 can be configured to determine, in particular to reconstruct, a hole element 164 of the confocal stop element 156 that generates the pattern. The evaluation unit 162 can be configured to determine, by means of at least one reconstruction algorithm, a determination location 112, in particular at least one hole element 164, from which the portion of the detection beam 158 originates. By way of example, a hole element 164 that generates the pattern can be determined from the position of the illuminated pixels and/or from a structure of the pattern. Such an evaluation of the wavelength-dependent image content can enable an overlapping use of the pixels of the sensor element.

The evaluation unit 162 can be configured to determine the generating hole element 164 of the confocal stop element 156 by means of the reconstruction algorithm. The evaluation unit 162 can be configured to separate overlapping spatial and spectral information, in particular by means of at least one algorithmic method. A lateral reconstruction, that is to say a determination of the generating hole element 164, can be carried out by means of inversion of an effect of the second optical element 154 on the portions of the detection light beam 158, for example using at least one mathematical optimization method, in particular by means of the method of least squares. The reconstruction algorithm for determining the generating hole element can comprise at least one compressed sensing method. The evaluation unit 162 can be configured to carry out an optimizing algorithm. An optimization can be carried out for example by a method based on the principle of the sparse basis.

The confocal stop element 156 can have a multiplicity of hole elements 164. A hole element 164 can have at least one bandpass filter, in particular at least one structured dielectric bandpass filter. The confocal stop element 156 comprises at least one second stop element, which can be arranged upstream of the sensor element 152 in the direction of propagation of the detection light beam 158. The confocal stop element 156 can be arranged in such a way that light returned from the measurement object 114 can impinge on the confocal stop element 156. FIG. 1 shows an embodiment in which, for two wavelengths, the first wavelength and the second wavelength, of the illumination light beam 130 a focus is situated on the surface of the measurement object 114. At the same time, portions, for example a first portion 166 and a second portion 168, of the detection light beam 158 for said wavelengths can be focused in at least one hole element 164 in such a way that the intensity on the sensor element 152 becomes maximal. The confocal stop element 156 can be configured to block out all further non-focused spectral portions of the detection light beam 158. The confocal stop element 156 can be configured to transmit a third portion 170 of the detection light beam 158 without influencing it. A distance between two hole elements 126 of the first stop element 124 and/or two hole elements 164 of the confocal stop element 156 can be such that confocality conditions are met. The distance can be chosen in such a way that spectra of the hole elements overlap. The evaluation unit 162 can be configured to separate overlapping spatial and spectral information, in particular by means of at least one algorithmic method.

The sensor element 152 can be configured to image the measurement object 114 in the third wavelength, in particular over the whole area. A whole-area image capture and/or whole-area imaging of the measurement object, in particular a two-dimensional, lateral, in particular in x and y, image capture and/or imaging, can be carried out with this selected wavelength. The confocally chromatic sensor 110 can be configured to carry out the determination of the coordinates and capture of at least one lateral imaging of the measurement object 114 simultaneously. In this embodiment, the third wavelength selected for the areal imaging can be arranged in a centre of the emission spectrum of the illumination device 128. In particular, spectral portions having longer and shorter wavelengths than the selected wavelength can be focused in an object space. In this regard, the portions chosen and/or used for the determination of the coordinates can generate a distance control signal for the areal imaging. The sensor unit 150 can be configured as a chip which is coated with at least one bandpass filter raster and in which pixels of the sensor element 144 arranged downstream of the bandpass filter capture the lateral imaging of the measurement object 114 and in which protected and/or covered pixels effecting broadband pick-up receive the wavelength-dependent image content. The protected and/or covered pixels effecting broadband pick-up can be protected and/or covered for example with at least one band block and/or narrowband mirror. In the case of such a configuration, portions of at least one detection light beam 158 which are used for the lateral imaging can be influenced by the second optical element 154. The evaluation unit 162 can be configured to deconvolve an influence of the second optical element 154 from the lateral imaging determined by the sensor element 152 by means of at least one deconvolution operation. The confocally chromatic sensor 110 can be configured to determine a multiplicity of vertical and/or laterally offset lateral imagings, in particular an image stack, and to combine them to form a combined lateral imaging. This can make it possible to support and increase the accuracy of the deconvolution operation, in particular in embodiments in which, as described further below, the illumination device 128 introduces a chromatism.

The invention claimed is:

1. A confocally chromatic sensor for determining coordinates of at least two different determination locations of at least one measurement object, comprising:
   at least one first stop element having at least two hole elements;
   at least one illumination device configured to generate at least one illumination light beam and to illuminate the measurement object through the first stop element at the at least two determination locations;
   at least one first optical element, configured to focus at least one portion of the illumination light beam at at least two focal points in at least one focal plane along an optical axis of the first optical element, wherein the illumination device and/or the first optical element have/has chromatically aberrative properties;
   at least one sensor unit, wherein the sensor unit has at least one sensor element, wherein the sensor element is configured to determine at least one wavelength-dependent image content, wherein the sensor unit has at least one second optical element;
   at least one confocal stop element having at least two hole elements, wherein the confocal stop element is configured to transmit at least one portion of at least one detection light beam emanating from the measurement object to the second optical element for which the measurement object is in the focal plane of the first optical element, wherein the second optical element is configured to generate the wavelength-dependent image content from the portion of the detection light beam; and
   at least one evaluation unit configured to determine the at least two coordinates of the determination locations from the wavelength-dependent image content.

2. The confocally chromatic sensor according to claim 1, wherein the wavelength-dependent image content is selected from the group consisting of at least one pattern, at least one diffraction figure, at least one geometric figure, at least one color-dependent figure.

3. The confocally chromatic sensor according to claim 1, wherein the second optical element is selected from the group consisting of at least one diffractive optical element, at least one refractive optical element.

4. The confocally chromatic sensor according to claim 1, wherein the first stop element and/or the confocal stop element have/has a multiplicity of hole elements.

5. The confocally chromatic sensor according to claim 1, wherein a hole element of the first stop element and/or a hole element of the confocal stop element have/has at least one bandpass filter.

6. The confocally chromatic sensor according to claim 1, wherein a distance between two hole elements is such that confocality conditions are met.

7. The confocally chromatic sensor according to claim 1, wherein the sensor element is configured to determine at least one spatial and spectral dependence of an intensity of the at least one portion of the detection light beam in an image plane.

8. The confocally chromatic sensor according to claim 7, wherein the second optical element is configured to separate at least two portions of the detection light beam depending on the wavelength in the image plane in such a way that the portions are spatially separated and/or arranged in an overlapping fashion.

9. The confocally chromatic sensor according to claim 1, wherein the evaluation unit is configured to recognize the wavelength-dependent image content and/or to recognize a distribution and/or position of the wavelength-dependent image content and to determine a hole element of the confocal stop element that generates the wavelength-dependent image content.

10. The confocally chromatic sensor according to claim 1, wherein the confocally chromatic sensor is configured to carry out the determination of the coordinates and capture of at least one lateral imaging of the measurement object simultaneously.

11. The confocally chromatic sensor according to claim 1, wherein the illumination device has at least one polychromatic light source and/or at least one white light source and/or at least one broadband light source.

12. The confocally chromatic sensor according to claim 1, wherein the at least one evaluation unit is configured to assign the detected image content to a wavelength based upon a comparison of said detected image content with a plurality of predetermined image contents.

13. The confocally chromatic sensor according to claim 12, wherein said plurality of predetermined image contents comprise a predetermined image content for a multiplicity of different wavelengths.

14. A method for determining coordinates of at least two different determination locations of at least one measurement object, wherein the method comprises the following steps:
   generating at least one illumination light beam fusing at least one illumination device;

illuminating the measurement object with the illumination light beam through a first stop element having at least two hole elements at the at least two determination locations;

focusing portions of the illumination light beam fusing a first optical element at at least two focal points in at least one focal plane along an optical axis of the first optical element, wherein the illumination device and/or the first optical element have chromatically aberrative properties;

determining at least one wavelength-dependent image content using at least one sensor element of at least one sensor unit, wherein the sensor unit has at least one second optical element, illuminating the at least one sensor unit with at least one detection light beam emanating from the measurement object through at least one confocal stop element having at least two hole elements;

generating the wavelength-dependent image content with the second optical element from at least one portion of the detection light beam for which the measurement object is in the focal plane of the first optical element; and determining from the wavelength-dependent image content the at least two coordinates of the determination locations fusing at least one evaluation unit.

15. The method according to claim 14, wherein a confocally chromatic sensor is used.

* * * * *

UNITED STATES PATENT AND TRADEMARK OFFICE
CERTIFICATE OF CORRECTION

PATENT NO. : 10,151,576 B2
APPLICATION NO. : 15/786721
DATED : December 11, 2018
INVENTOR(S) : Nils Haverkamp et al.

It is certified that error appears in the above-identified patent and that said Letters Patent is hereby corrected as shown below:

In the Claims

<u>Column 24</u>
Line 66, Claim 14        delete "fusing" and insert --using--

<u>Column 25</u>
Line 5, Claim 14        delete "fusing" and insert --using--

<u>Column 25</u>
Line 26, Claim 14        delete "fusing" and insert --using--

Signed and Sealed this
Ninth Day of April, 2019

Andrei Iancu
*Director of the United States Patent and Trademark Office*